US012615543B2

(12) United States Patent
Canpolat et al.

(10) Patent No.:  US 12,615,543 B2
(45) Date of Patent:  Apr. 28, 2026

(54) QOS TRAFFIC STREAM SETUP WITH STREAM CLASSIFICATION SERVICE (SCS) REQUEST/RESPONSE

(71) Applicant: Intel Corporation, Santa Clara, CA (US)

(72) Inventors: Necati Canpolat, Beaverton, OR (US); Dibakar Das, Hillsboro, OR (US); Ganesh Venkatesan, Hillsboro, OR (US); Dave A. Cavalcanti, Portland, OR (US); Laurent Cariou, Milizac (FR); Cheng Chen, Camas, WA (US); Carlos Cordeiro, Portland, OR (US); Juan Fang, Portland, OR (US); Chittabrata Ghosh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 18/030,435

(22) PCT Filed: Dec. 8, 2021

(86) PCT No.: PCT/US2021/062347
§ 371 (c)(1),
(2) Date: Apr. 5, 2023

(87) PCT Pub. No.: WO2022/146635
PCT Pub. Date: Jul. 7, 2022

(65) Prior Publication Data
US 2023/0379749 A1      Nov. 23, 2023

Related U.S. Application Data

(60) Provisional application No. 63/133,658, filed on Jan. 4, 2021.

(51) Int. Cl.
*H04W 28/02* (2009.01)
*H04L 45/243* (2022.01)
(Continued)

(52) U.S. Cl.
CPC ....... *H04W 28/0268* (2013.01); *H04L 45/243* (2022.05); *H04W 28/0263* (2013.01); *H04W 28/12* (2013.01); *H04W 84/12* (2013.01)

(58) Field of Classification Search
CPC ......... H04W 28/0268; H04W 28/0263; H04W 84/12; H04W 28/12; H04W 48/18; H04L 45/243; H04L 41/5041; H04L 65/60
(Continued)

(56) References Cited

U.S. PATENT DOCUMENTS

| | | | |
|---|---|---|---|
| 2017/0250851 A9 * | 8/2017 | Balasubramanian | ... H04L 43/16 |
| 2021/0352722 A1 * | 11/2021 | Xin | ........................... H04L 1/08 |
| 2022/0132608 A1 * | 4/2022 | Chu | ...................... H04W 76/15 |

FOREIGN PATENT DOCUMENTS

WO      WO-2022146635 A1      7/2022

OTHER PUBLICATIONS

"IEEE Standard 802.11 Wireless LAN Medium Access Control (MAC) and Physical Layer (PHY) Specifications Amendment 2: MAC Enhancements for Robust Audio Video Streaming" May 29, 2012 (Year: 2012).*
(Continued)

*Primary Examiner* — Omer S Mian
(74) *Attorney, Agent, or Firm* — Schwegman Lundberg & Woessner, P.A.

(57) ABSTRACT

A non-Access Point Extremely High Throughput Station (non-AP EHT STA) initiates a Quality-of-Service (QoS) setup by sending a Stream Classification Service (SCS) Request frame to an associated access point (AP). The SCS request frame may be encoded to have a request type field
(Continued)

set to "Add" and may contain an SCS Descriptor element having a traffic description field, a traffic classification field, and a Multi-Link Operation (MLO) field. The non-AP EHT STA may decode an SCS Response frame from the AP that indicate whether the QoS setup has been added. The non-AP EHT STA may then exchange a QoS traffic flow with the associated AP in accordance with the QoS setup when the QoS setup has been added. When the QoS traffic flow ends, the non-AP EHT STA may encode a second SCS Request frame for transmission to the AP with the request type field set to "Remove" to delete the QoS setup.

14 Claims, 10 Drawing Sheets

(51)  Int. Cl.
      *H04W 28/12*          (2009.01)
      *H04W 84/12*          (2009.01)
(58)  Field of Classification Search
      USPC .......................................... 370/254; 455/500
      See application file for complete search history.

(56)                   References Cited

OTHER PUBLICATIONS

"International Application Serial No. PCT/US2021/062347, International Search Report mailed Mar. 17, 2022", 2 pgs.

"International Application Serial No. PCT/US2021/062347, Written Opinion mailed Mar. 17, 2022", 4 pgs.

Alex, Ashley, "Moving SCS request element in to action frame", IEEE 802.11-10/095Ir2, (Sep. 2010), 1-5.

Dave, Cavalcanti, et al., "Enhancements for QoS and low latency in 802.11 be R1", IEEE 802.11-20/1350r4, (Dec. 3, 2020), 1-14.

Katarzyna, Kosek-Szott, et al., "What's New for QoS in IEEE 802.11?", ResearchGate, (Jul. 16, 2014).

Matthew, Fischer, et al., "CR MSCS and 004158", IEEE 802.11-2O/O516rI7, (Jul. 7, 2020), 1-12.

Thomas, Derham, et al., "CR 2693 Mirrored SCS", IEEE 802.1 I-19/0420r4, (May 14, 2019), 1-18.

"International Application Serial No. PCT US2021 062347, International Preliminary Report on Patentability mailed Jul. 13, 2023", 6 pgs.

"European Application Serial No. 21916178.3, Extended European Search Report mailed Oct. 2, 2024", 22 pgs.

"IEEE P802.11aa(TM) DO.02 Draft Standard for Information Technology—Telecommunications and information exchange between systems—Local and metropolitan area networks—Specific requirements—Part 11 : Wireless LAN Medium Access Control (MAC) and Physical Lay", The 802 11 Working Group of the IEEE 802 Committee IEEE Draft; Draft P802.11 Aa_D0.02, IEEE-Sa, Piscataway, NJ USA vol. 802.11 aa drafts, No. DO.02, [Online]. Retrieved from the Internet: URL:www.ieee802.org 11 archive2 11aa Draft P802. 11aa_D0.02.pdf, (Nov. 4, 2009), 1-65.

* cited by examiner

MULTI-LINK AP LOGICAL ENTITY

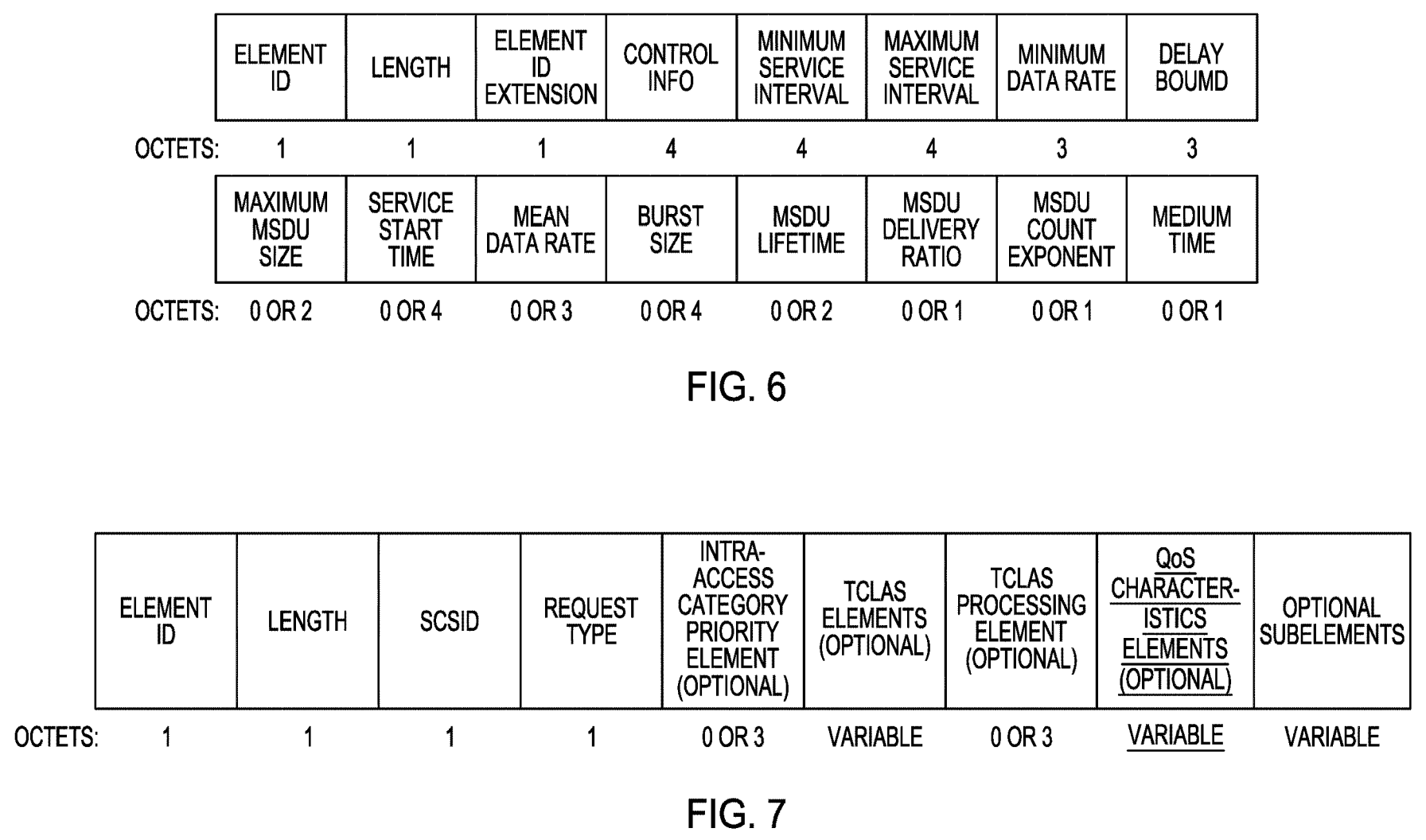

| ELEMENT ID | LENGTH | ELEMENT ID EXTENSION | CONTROL INFO | MINIMUM SERVICE INTERVAL | MAXIMUM SERVICE INTERVAL | MINIMUM DATA RATE | DELAY BOUMD |
|---|---|---|---|---|---|---|---|
| 1 | 1 | 1 | 4 | 4 | 4 | 3 | 3 |

| MAXIMUM MSDU SIZE | SERVICE START TIME | MEAN DATA RATE | BURST SIZE | MSDU LIFETIME | MSDU DELIVERY RATIO | MSDU COUNT EXPONENT | MEDIUM TIME |
|---|---|---|---|---|---|---|---|
| 0 OR 2 | 0 OR 4 | 0 OR 3 | 0 OR 4 | 0 OR 2 | 0 OR 1 | 0 OR 1 | 0 OR 1 |

OCTETS:

FIG. 6

| ELEMENT ID | LENGTH | SCSID | REQUEST TYPE | INTRA-ACCESS CATEGORY PRIORITY ELEMENT (OPTIONAL) | TCLAS ELEMENTS (OPTIONAL) | TCLAS PROCESSING ELEMENT (OPTIONAL) | QoS CHARACTER-ISTICS ELEMENTS (OPTIONAL) | OPTIONAL SUBELEMENTS |
|---|---|---|---|---|---|---|---|---|
| 1 | 1 | 1 | 1 | 0 OR 3 | VARIABLE | 0 OR 3 | VARIABLE | VARIABLE |

OCTETS:

FIG. 7

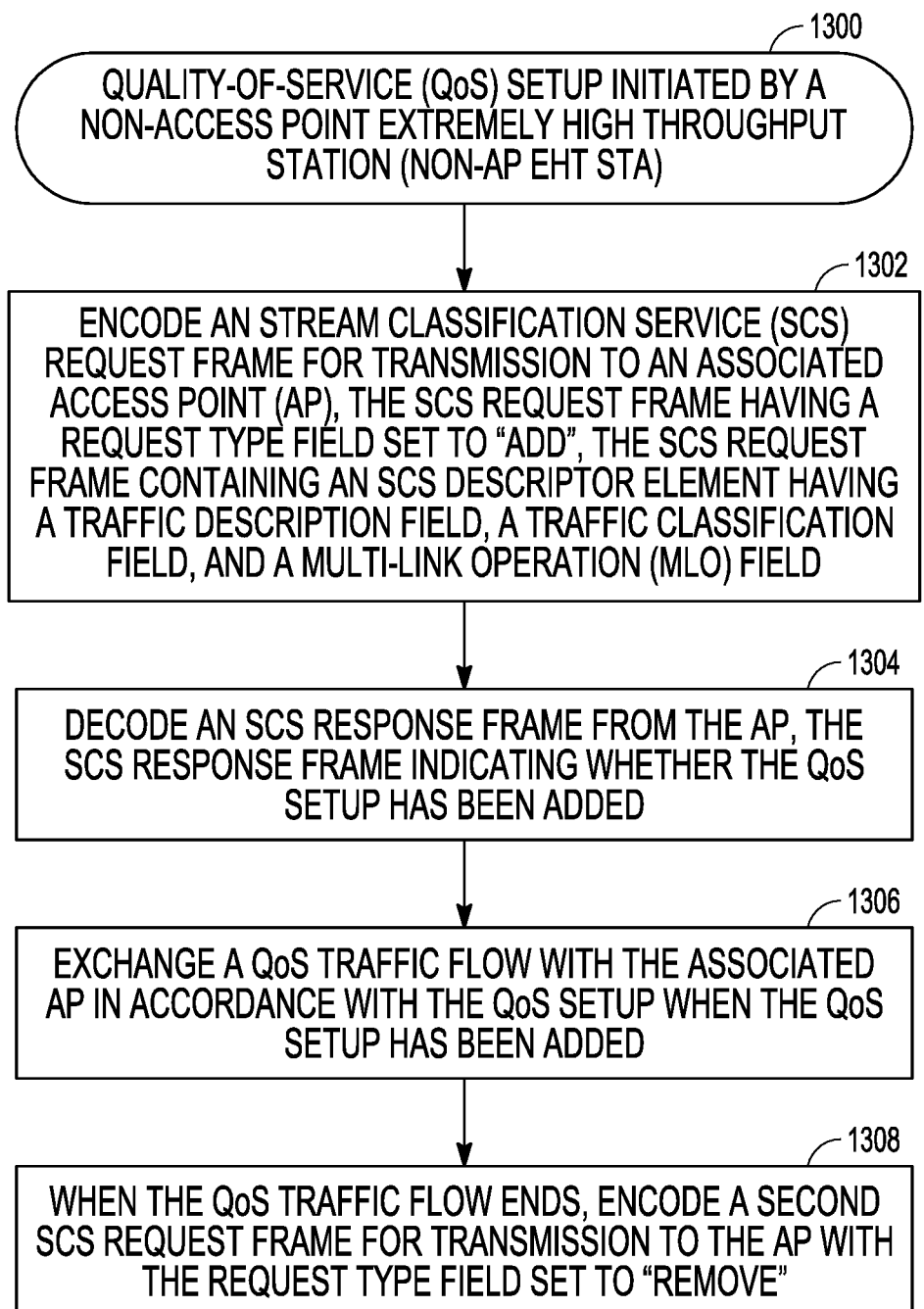

```
                                                              ┌ 1300
┌─────────────────────────────────────────────────────────┐
│  QUALITY-OF-SERVICE (QoS) SETUP INITIATED BY A          │
│  NON-ACCESS POINT EXTREMELY HIGH THROUGHPUT              │
│  STATION (NON-AP EHT STA)                               │
└─────────────────────────────────────────────────────────┘
```

ENCODE AN STREAM CLASSIFICATION SERVICE (SCS) REQUEST FRAME FOR TRANSMISSION TO AN ASSOCIATED ACCESS POINT (AP), THE SCS REQUEST FRAME HAVING A REQUEST TYPE FIELD SET TO "ADD", THE SCS REQUEST FRAME CONTAINING AN SCS DESCRIPTOR ELEMENT HAVING A TRAFFIC DESCRIPTION FIELD, A TRAFFIC CLASSIFICATION FIELD, AND A MULTI-LINK OPERATION (MLO) FIELD

DECODE AN SCS RESPONSE FRAME FROM THE AP, THE SCS RESPONSE FRAME INDICATING WHETHER THE QoS SETUP HAS BEEN ADDED

EXCHANGE A QoS TRAFFIC FLOW WITH THE ASSOCIATED AP IN ACCORDANCE WITH THE QoS SETUP WHEN THE QoS SETUP HAS BEEN ADDED

WHEN THE QoS TRAFFIC FLOW ENDS, ENCODE A SECOND SCS REQUEST FRAME FOR TRANSMISSION TO THE AP WITH THE REQUEST TYPE FIELD SET TO "REMOVE"

FIG. 13

QOS TRAFFIC STREAM SETUP WITH STREAM CLASSIFICATION SERVICE (SCS) REQUEST/RESPONSE

PRIORITY CLAIM

This application is a U.S. National Stage Filing under 35 U.S.C. 371 from International Application No. PCT/US2021/062347, filed Dec. 8, 2021 and published in English as WO 2022/146635 on Jul. 7, 2022, which claims the benefit of priority to U.S. Provisional Patent Application Ser. No. 63/133,658, filed Jan. 4, 2021 each of which is incorporated herein by reference in its entirety.

TECHNICAL FIELD

Embodiments pertain to wireless communications. Some embodiments relate to wireless local area networks (WLANs) and Wi-Fi networks including networks operating in accordance with the IEEE 802.11 family of standards. Some embodiments relate to Quality-of-Service (QoS) setup. Some embodiments relate to multi-link devices (MLDs) and multi-link operation (MLO).

BACKGROUND

One issue with QoS traffic stream management in wireless networks is that there is no signalling mechanism defined for an access point to enforce network policies. Another issue with QoS traffic stream management in wireless networks is that QoS requirement signalling is not flexible enough to take into account newer traffic types and newer mechanisms that provide for dynamic adaptation to wireless channel conditions to maintain latency, reliability and throughput mechanisms in order to deliver the required QoS.

Thus there are needs for improved signalling mechanisms for QoS traffic stream management in wireless networks.

BRIEF DESCRIPTION OF THE DRAWINGS

FIG. 6 illustrates a QoS characteristics element in accordance with some embodiments.

FIG. 7 illustrates an SCS descriptor element, in accordance with some embodiments.

FIG. 13 illustrates a Quality-of-Service (QoS) setup procedure initiated by a non-Access Point Extremely High Throughput Station (non-AP EHT STA) in accordance with some embodiments.

DETAILED DESCRIPTION

Figures 1, 2:
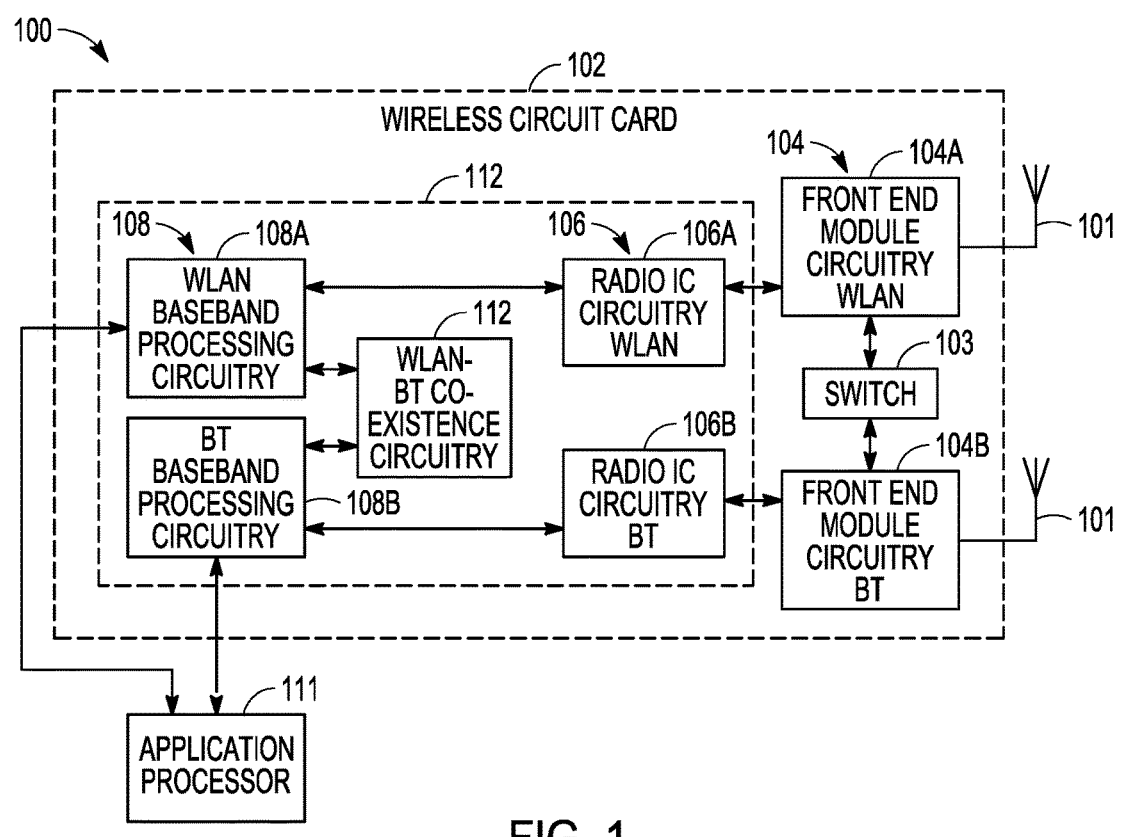
FIG. 1 is a block diagram of a radio architecture in accordance with some embodiments.
FIG. 2 illustrates a front-end module circuitry for use in the radio architecture of FIG. 1 in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to a non-Access Point Extremely High Throughput Station (non-AP EHT STA) configured to initiate a Quality-of-Service (QoS) setup. In these embodiments, the non-AP EHT STA may encode an Stream Classification Service (SCS) Request frame for transmission to an associated access point (AP). The SCS request frame may be encoded to have a request type field set to "Add". The SCS request frame may contain an SCS Descriptor element having a traffic description field, a traffic classification field, and a Multi-Link Operation (MLO) field. In these embodiments, the non-AP EHT STA may decode an SCS Response frame from the AP. The SCS Response frame may indicate whether the QoS setup has been added. In these embodiments, the non-AP EHT STA may then exchange a QoS traffic flow with the associated AP in accordance with the QoS setup when the QoS setup has been added. In these embodiments, the non-AP EHT STA may, when the QoS traffic flow ends, encode a second SCS Request frame for transmission to the AP with the request type field set to "Remove" to delete the QoS setup. These embodiments as well as others are described in more detail below.

In some embodiments, to modify an existing QoS setup, the non-AP EHT STA encode an SCS request frame for transmission to the AP with the request type field set to "Change" and include a corresponding QoS setup ID in an SCS ID field of the SCS Descriptor element. In these embodiments, modifications to the existing QoS setup may be indicated in at least one of the traffic description field, the traffic classification field, and the MLO field.

In some embodiments, for modification of the existing QoS setup by the AP, the non-AP EHT STA may decode an autonomous SCS Response frame from the AP. In these embodiments, when the autonomous SCS Response frame has a Dialog Token set to zero (0) and has an SCS ID set to that of the QoS setup, the non-AP EHT STA may modify the existing QoS setup in accordance with an SCS Description element of the autonomous SCS Response frame.

In some embodiments, the SCS Descriptor element may include QoS characteristics comprising a maximum MAC service data unit (MSDU) size, a latency (i.e., delay) bound, a minimum service interval, a maximum service interval, a burst size, a MSDU delivery ratio, a medium time, and a service start time. This is unlike a conventional add traffic stream (ADDTS) request/response frame process with uses a TSPEC element, which for example, does not include the MSDU delivery ratio. In some embodiments, the QoS characteristics may be encoded in a QoS characteristics element within the SCS Descriptor element.

In some embodiments, the non-AP EHT STA may be configured for operating as an affiliated STA that is part of a non-AP multi-link device (MLD) that includes a plurality of affiliated non-AP STAs. In these embodiments, the non-AP MLD communicates with an AP MLD comprising a plurality of affiliated APs over a plurality of pairs of links using a single medium access control (MAC) service access point (SAP). In these embodiments, the non-AP EHT STA may initiate the QoS setup for an MLD level QoS traffic flow with the AP MLD.

In some embodiments, to initiate the QoS setup for the MLD level QoS traffic flow (i.e., an MLD level SCS stream) with the AP MLD, the non-AP EHT STA may encode an SCS request frame to include an SCS ID to identify an MLD level SCS stream. In these embodiments, the QoS characteristics element may have a subfield set to indicate that the QoS setup is for the MLD level QoS traffic flow rather than a direct link between the non-AP EHT STA and the AP.

Some embodiments are directed to a non-transitory computer-readable storage medium that stores instructions for execution by processing circuitry of a non-Access Point Extremely High Throughput Station (non-AP EHT STA), In these embodiments, the processing circuitry may be configured to initiate a Quality-of-Service (QoS) setup. These embodiments, as well as others, are described in more detail below.

Some embodiments are directed to an Extremely High Throughput Access Point (EHT AP). In these embodiments, for initiation of a Quality-of-Service (QoS) setup by an non-AP EHT station (STA), the EHT AP may decode an Stream Classification Service (SCS) Request frame from the STA. The SCS request frame may have a request type field set to "Add" and may contain an SCS Descriptor element having a traffic description field, a traffic classification field, and a Multi-Link Operation (MLO) field. In these embodiments, the EHT AP may also encode an SCS Response frame for transmission to the STA that indicates that the QoS setup has been added when network policy for the QoS setup is verified. In these embodiments, the EHT AP may also exchange a QoS traffic flow with the AP in accordance with the QoS setup when the QoS setup has been added. In these embodiments, the EHT AP may also, when the QoS traffic flow ends, decode a second SCS Request frame from the STA with the request type field set to "Remove" to delete the QoS setup. These embodiments, as well as others, are described in more detail below.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including the AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies, however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
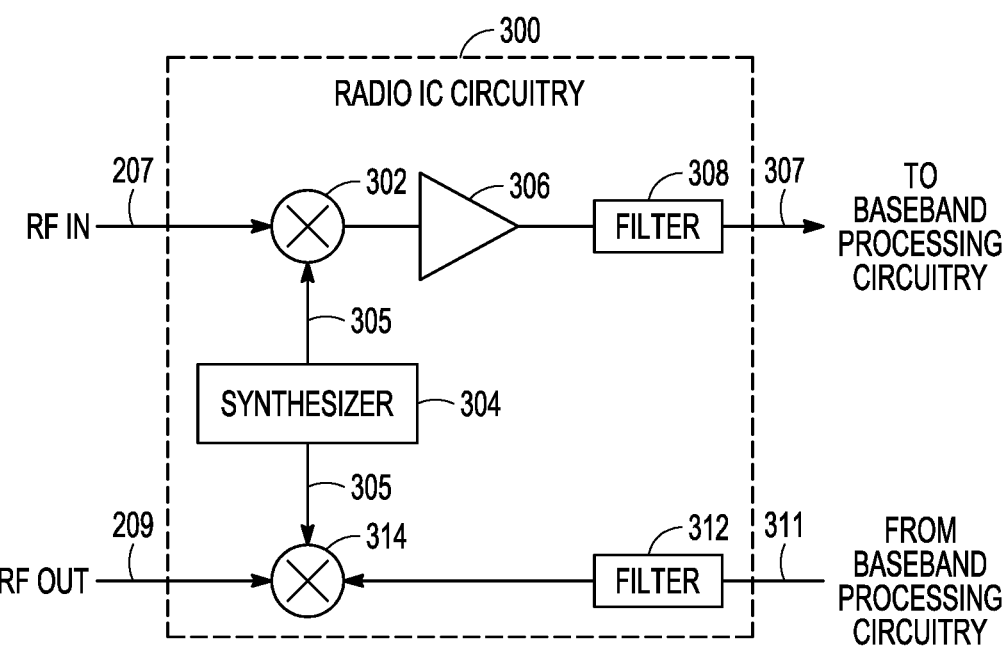
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
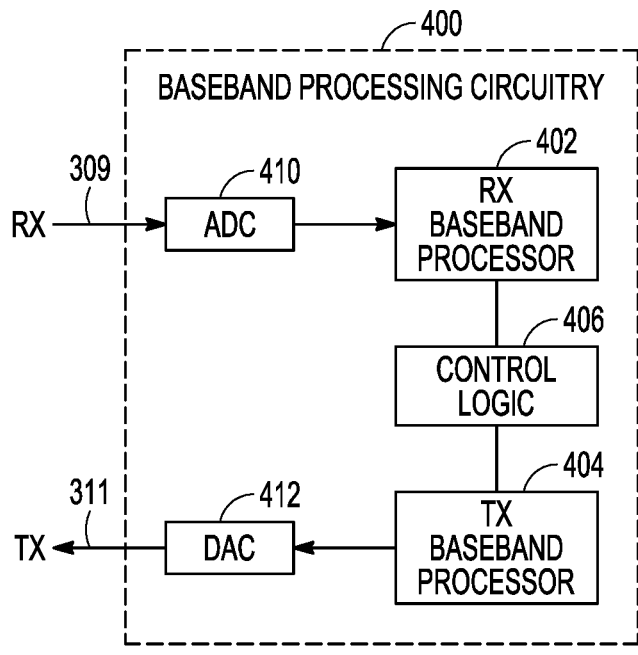
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
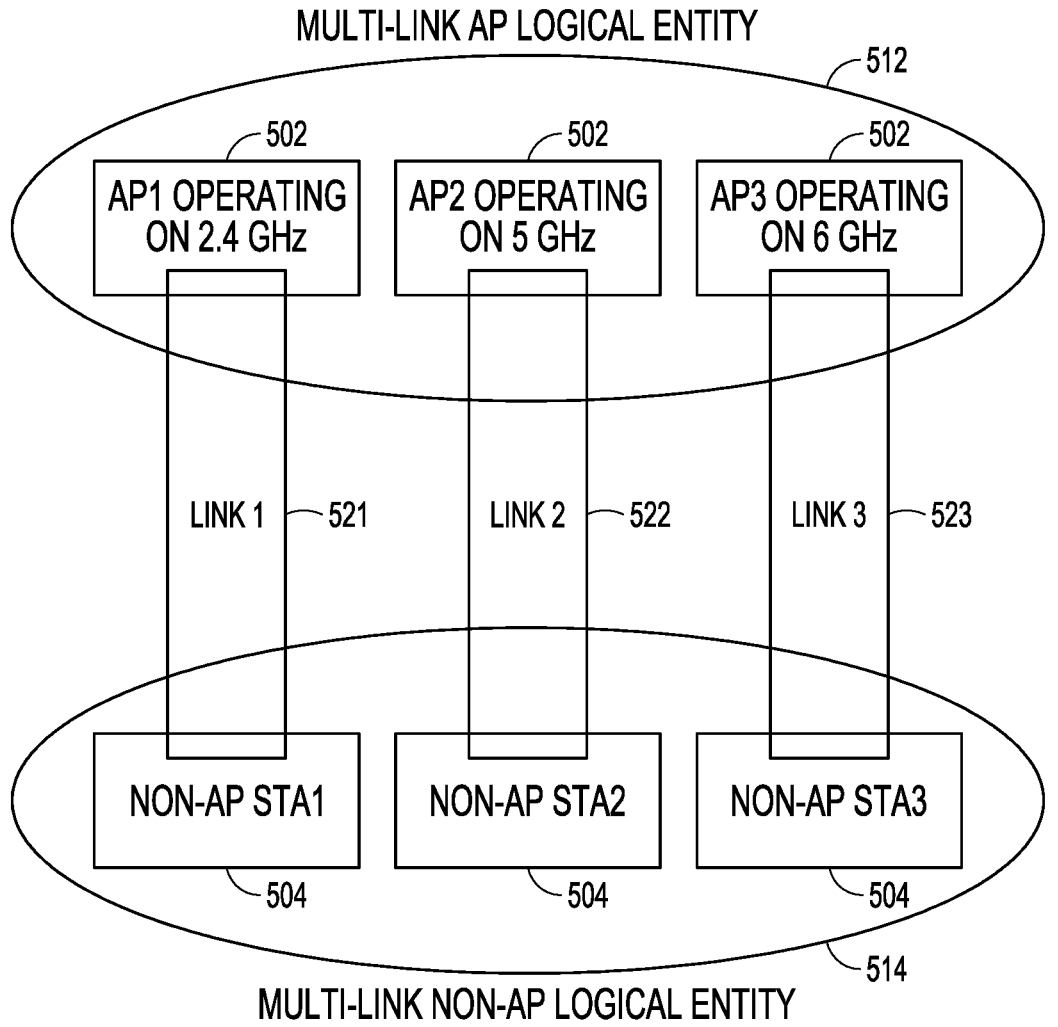
FIG. 5 illustrates a multi-link framework in accordance with some embodiments.

FIG. 5 illustrates a multi-link framework in accordance with some embodiments. The multi-link framework includes an access point (AP) multi-link device (AP MLD) 512 comprising a plurality of affiliated access point stations (AP STAs) 502 and a non-AP MLD 514 comprising a plurality of affiliated non-AP STAs 504. The AP MLD and the non-AP MLD may perform a multi-link setup procedure to set up the pairs of links 521, 522, 523 between the AP STAs 502 of the AP MLD 512 and corresponding non-AP STAs 504 of the non-AP MLD 514 to allow frames to be communicated between the non-AP MLD 514 and the AP MLD 512 using a single medium access control (MAC) service access point (SAP).

In some embodiments, all STAs affiliated with an MLD shall set the SCS Traffic Description Support subfield of the EHT Capabilities element that they transmit to the same value. An MLD may maintain SCS IDs at MLD level such that an SCS ID used by a STA affiliated with a non-AP MLD in an SCS Request frame transmitted to an AP affiliated with an AP MLD is unique across the non-AP MLD. In these embodiments, STAs affiliated with an MLD may set the SCS field of the Extended Capabilities element to the same value. The SCS ID may be used by a non-AP MLD to request creation, modification, or deletion of an SCS stream. The SCS ID is used by an AP MLD to identify an SCS stream in SCS responses. In some embodiments, an SCS Request frame sent by a non-AP STA affiliated with a non-AP MLD to the AP of an AP MLD that contains a QoS Characteristics element in which the Direction subfield is set to uplink or downlink may interpreted as a request for creation of an SCS stream that applies at the MLD level. Otherwise, a QoS Characteristics element in which the Direction subfield is set to direct link indicates the request for creation of an SCS stream between an non-AP STA and an AP.

FIG. 6 illustrates a QoS characteristics element in accordance with some embodiments. The QoS Characteristics element contains a set of parameters that define the characteristics and QoS expectations of a traffic flow, in the context of a particular non-AP EHT STA, for use by the EHT AP and the non-AP EHT STA in support of QoS traffic transfer.

FIG. 7 illustrates an SCS descriptor element, in accordance with some embodiments. The SCS Descriptor element defines information about the stream that is being classified using SCS procedures. The QoS Characteristics Element field contains zero or one QoS Characteristics element to describe the traffic characteristics and QoS expectations of traffic flows that belong to this SCS stream. Zero or one QoS Characteristics element is present when the Request Type field is equal to "Add" or "Change" and no QoS Characteristics element is present when the Request Type field is equal to "Remove".

IEEE 802.11 specification defines a mechanism to signal QoS requirements of 802.11 Stations (STAs) to the 802.11 Access Point (AP) they are associated with. While this meets the requirements from a STA perspective, there are scenarios where:

(a) the AP needs to enforce network policies (some due to network operating conditions) for which there are no signaling mechanisms defined.

(b) the QoS requirement signaling is not flexible enough to take into account newer traffic types (AR/VR, Time Sensitive Networking, etc.) and new evolving mechanisms in IEEE802.11 that provides for dynamic adaptation to wireless channel conditions to maintain latency, reliability and throughput mechanisms in order to deliver the required QoS.

In this disclosure, a flexible yet versatile QoS framework is presented that renders the signaling, management and policing of QoS in a wireless network, complete.

In the current IEEE802.11 specification, STAs signal their QoS requirements using an add traffic stream (ADDTS) Request frame in which they include a TSPEC element that describes the traffic; and optionally a TCLAS element in which parameters used to classify traffic that belong to the traffic are specified. The AP on receipt of the add traffic stream (ADDTS) Request responds with an ADDTS Response in which it either indicates that the requested QoS traffic has been admitted; or rejected. The decision to admit or reject is based on the availability to resources at the AP and what other QoS traffic has been admitted prior to the receipt of this ADDTS Request. At any point in time after an ADDTS Request has been admitted, a delete traffic stream (DELTS) Request can be transmitted either by the AP or the STA to delete the QoS setup for the corresponding traffic.

IEEE802.11 REVmd D5.0 defines a mechanism named Mirrored Stream Classification Service (MSCS) that provides a means for mirroring the QoS setup for uplink traffic for the corresponding downlink traffic. The QoS Setup procedure is based on DSCP tags in the Ethernet Header of the packets corresponding to the QoS Traffic. This does not address scenarios where there is no explicit DSCP tags and does not provide for uplink QoS setup. IEEE P802.11-REVmd/D3.2, March 2020 is incorporated herein by reference.

In addition, it is proposed to extend ADDTS mechanism to accommodate the requirements of Network-Centric Use Cases. Depends on DSCP setting in the Ethernet Header, does not address uplink QoS Setup, does not allow for classifying individual traffic streams (uses a traffic classification mask that matches all source/destination IP-address/port, protocol or none. So the setup cannot differentiate a stream based on a specific <source/destination IP-address/port, protocol>5-tuple. <<not granular>>.

Using ADDTS extensions as described in AD2647 has the following disadvantages:

(a) The ADDTS mechanism described in IEEE802.11 is different from that in the Wi-Fi Alliance (WFA) Wireless Multimedia (WMM) specification. Hence extensions to IEEE802.11 need to be correspondingly performed in WFA WMM Specification as well.

(b) ADDTS has limited traffic identifier (TID)/traffic stream identifier (TSID).

(0-15) which may be insufficient in some cases where an application spawns multiple QoS flows each of which needs to be identified independently (e.g. Wi-Fi 5G Use Case and Child SAs).

(c) ADDTS mechanism as described in IEEE802.11 is usable in modes outside the scope of the extensions discussed in this disclosure; and ADDTS as described in WFA WMM specification is usable in modes like power save which is outside the scope of this disclosure making it more complex to develop the corresponding specification to work around all possible exceptions.

Example embodiments of the present disclosure relate to systems, methods, and devices for an extensible Enhanced QoS framework for signaling requirements and managing and policing QoS setup in a Wireless Network using Stream Classification Service.

In one embodiment, an extensible Enhanced QoS framework system may describe a new set of QoS action frames that can be sent by a STA or an AP to:

i. establish a QoS setup using the IEEE802.11 Stream Classification Service framework with extensions to include a TSPEC element describing:

a. based on a set of parameters that describe the traffic (e.g., MSDU size, periodicity, required latency, required reliability, etc.)

b. based on a minimal set of transmit requirements indicating transmit opportunities required in order to provide the corresponding flow with a specific QoS c. flexibility to define parameters for other features in newer 802.11 amendments that enable QoS (e.g., to leverage MLD)

ii. propose an alternate QoS Setup in response to a request from the STA that provides the requested QoS but better fits the AP/Network condition iii. Amend an established QoS setup that maintains the current QoS but improves network performance iv. Amend an established QoS setup when the AP determines changes in the network policy or network conditions v. amend an established QoS setup as needed to match the application performance vi. amend an established QoS setup based on the outcome of QoS policing by the AP.

In addition, the proposed mechanism allows for the STA to start QoS traffic without explicitly setting up QoS with the AP. The AP based on the analysis of the QoS traffic from and to the STA, could setup QoS. The proposed solution facilitates adaptive QoS for both the STA and the AP resulting in better application performance over the wireless network and potentially better network utilization (detects and mitigates over-subscription to accommodate worst case network conditions).

In one or more embodiments, an extensible Enhanced QoS framework system may define mechanisms to amend the admitted QoS that is set up using the stream classification service (SCS) specified in IEEE802.11 with extensions:

(a) in order for the AP to match network conditions/policies, (b) for the STA to improve application performance, (c) for the AP to police the QoS setup and specifically address the case where the resources dedicated for QoS setup are under-utilized.

In addition, the defined mechanism is extensible to:

(a) address emerging traffic types like time-sensitive traffic, Augmented/Virtual reality traffic, etc., (b) leverage new features developed as part of emerging IEEE802.11 amendments like 802.11be Multi-link Devices (MLDs).

Figure 8:
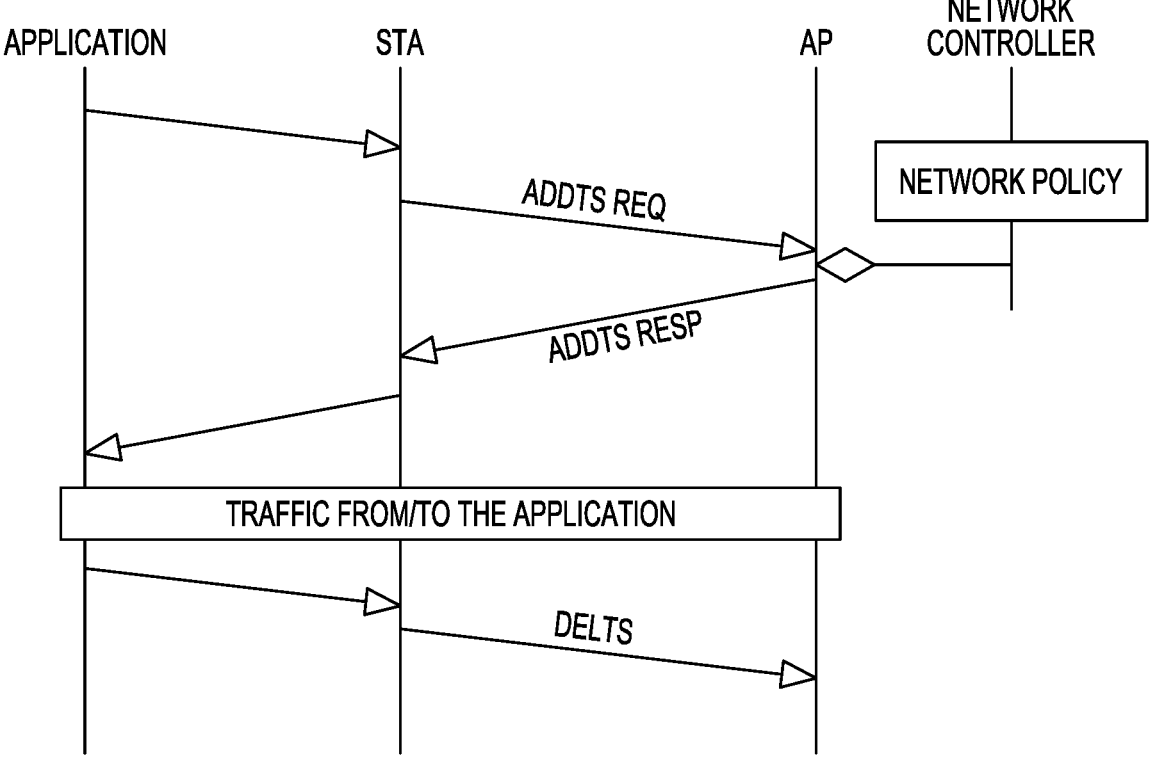
FIG. 8 illustrates a QoS Setup mechanism in IEEE802.11-2016.

FIG. 8 illustrates a QoS Setup mechanism in IEEE802.11-2016

The Robust AV streaming action SCS Request frame with request type set to Add is used to either setup the QoS or modify an existing QoS Setup. The Robust AV streaming action SCS Response fame is the corresponding response. When the corresponding QoS traffic flow ends, a SCS Request frame with request type set to Remove is used to delete the corresponding QoS setup.

In one embodiment the SCS Request frame type can be set to a new value (e.g., "4") indicating that this serves as a frame requesting enablement of (National Security and Emergency Preparedness (NSEP) Priority Access service.

In one embodiment the SCS Request frame type can be set to a new value (e.g., "5") indicating that this serves as a frame requesting disablement of national security and emergency preparedness (NSEP) Priority Access service.

In one embodiment the SCS Request frame type can be set to a new value (e.g., "6") indicating that this frame includes additional parameters to describe traffic characteristics (e.g., a new element or traffic specification (TSPEC) or a modified TSPEC element).

A STA may initiate a QoS setup by sending a SCS Request to the associated AP. The STA indicates the QoS characteristics of the traffic using the Traffic Description, Traffic Classification and Multi-Link Operation Specific fields. The Traffic Description and Multi-Link Operation Specific fields are extensions to the SCS Descriptor element defined in IEEE802.11.

A STA may modify an existing QoS setup by sending a SCS Request with request type set to Change to the associated AP by specifying the corresponding QoS setup id in the SCS ID field of the SCS Descriptor element included in the SCS Request frame. The modifications are indicated in Traffic Description, Traffic Classification and Multi-Link Operation Specific fields.

The AP may initiate a QoS setup as follows:
SCS Request/SCS Response as would the STA The AP may at any time modify an established QoS setup by sending an autonomous SCS Response with the Dialog Token set to 0 and the SCS ID set to that of the QoS setup that the SCS Response modifies.

In one embodiment the traffic description parameters can be included in the SCS Response frame as well.

Traffic Description is a description of the traffic for which the QoS is setup.

TSPEC-lite—a modified version of the basic TSPEC element. A reserved bit in the basic TSPEC element set to 1 can indicate if the element is the basic TSPEC element or the new TSPEC-lite element.

| Parameter | Size | Value | Description |
|---|---|---|---|
| Profile Lifetime | 1 octet | | Maintain lifetime for the flow - in seconds, 0 indicates infinite lifetime |

-continued

| Parameter | Size | Value | Description |
|---|---|---|---|
| Max MSDU size | 2 octets | | Maximum size of MSDU |
| Latency Bound | 1 octet | | Expected worst case latency in ms. |
| Min Service Interval | 4 octets | | Requested min periodicity of service |
| Jitter | 1 octet | | (variation in latency) Network jitter in ms. |
| Burst Size | 4 octets | | Max aggregate size MSDUs that arrive within a SP |
| Packet delivery ratio | 1 octet | | Expected PDR within latency bound |
| Flags | 1 Octet | | Place holder for anything special about the corresponding traffic stream that needs to made known to the peer |
| Criticality | | | Low/Medium/High - how critical is this stream for the operation of the system? |
| Tolerance to loss | | Yes/ No | how many contiguous packets can be lost before the application gets into a 'panic mode'? E.g., 2/10 (2 consecutive packets lost in the last 10 packets received) |
| Direction | 1 octet | 0-2 | 0 = UL, 1 = DL, 2 = bi-directional |

TSPEC-Transmit Opportunity—a variation of the basic TSPEC that characterizes the traffic in terms transmit opportunity requirements

| Parameter | Size | Value | Description |
|---|---|---|---|
| Profile Lifetime | 1 octet | | Maintain lifetime for the flow - in seconds, 0 indicates infinite lifetime |
| Tx Time | 1 octet | | Duration for UL(4 bits) and DL(4 bits) Tx in ms. |
| Periodicity/ Cycle Time | 2 octets | | Requested cycle time |
| Start Time | 8 octets | | Start Time expressed in units of TU indicating the time at which the first MSDU corresponding to the QoS traffic is expected to be transmitted. The value in the SCS Response would be the same as it was in the corresponding SCS Request |
| Direction | 1 octet | 0-2 | 0 = UL, 1 = DL, 2 = bi-directional |
| UP-Map | 1 octet | | UPs for which this TWT should be used. Used for policing traffic. The policing logic watches for appropriate UP to be assigned to the traffic that is sent/received using the corresponding QoS Setup. |
| Assigned transmit opportunity | | TWT or TWT-like element | Included only in SCS Response when the Status Code is ACCEPT or MODIFY and indicates the assigned transmit opportunity for the corresponding QoS setup |

Figure 9:
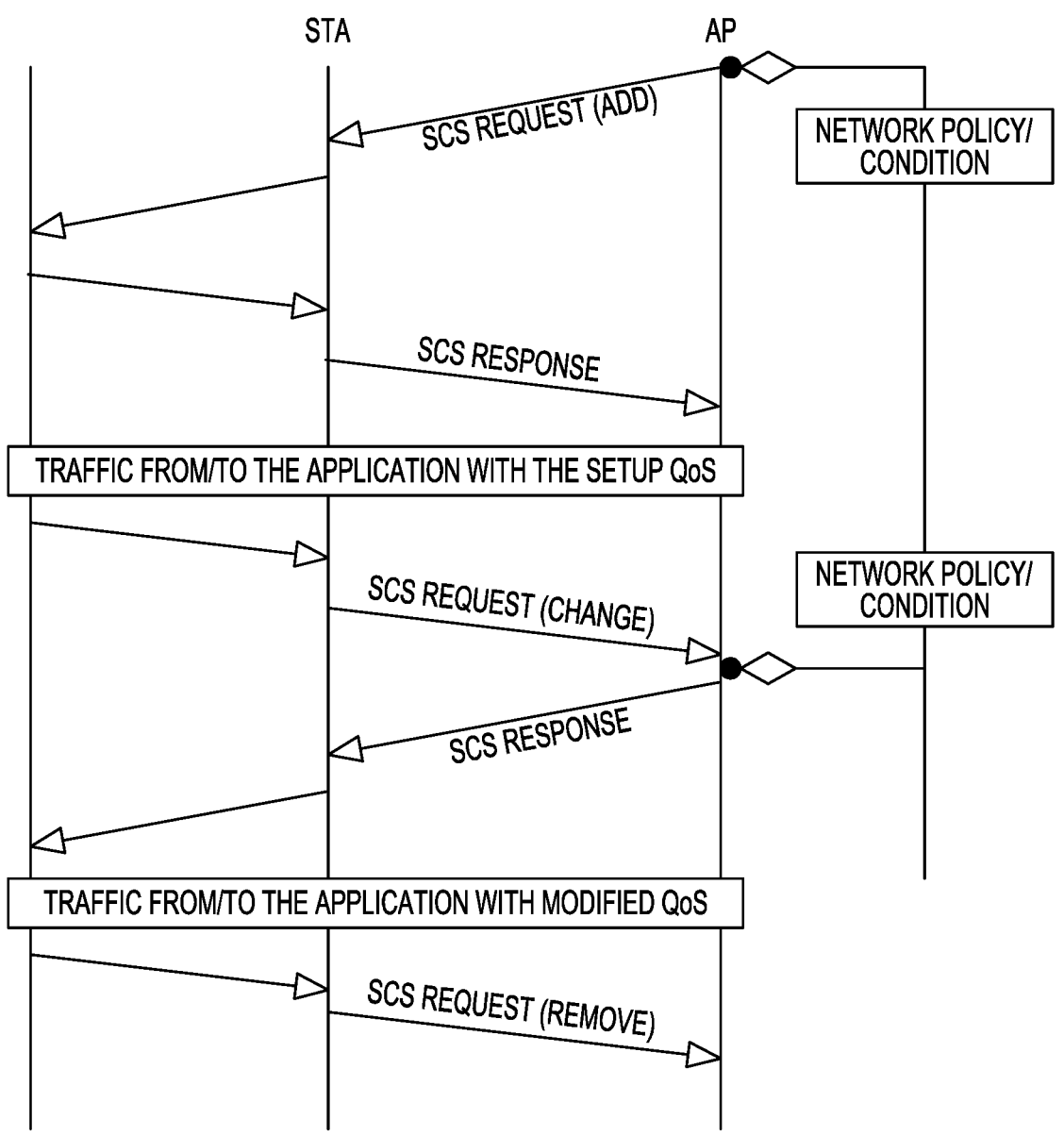
FIG. 9 illustrates a scenario where the AP initiates QoS Setup with a STA and the STA modifies the QoS setup midway through the flow, in accordance with some embodiments.
Figure 10:
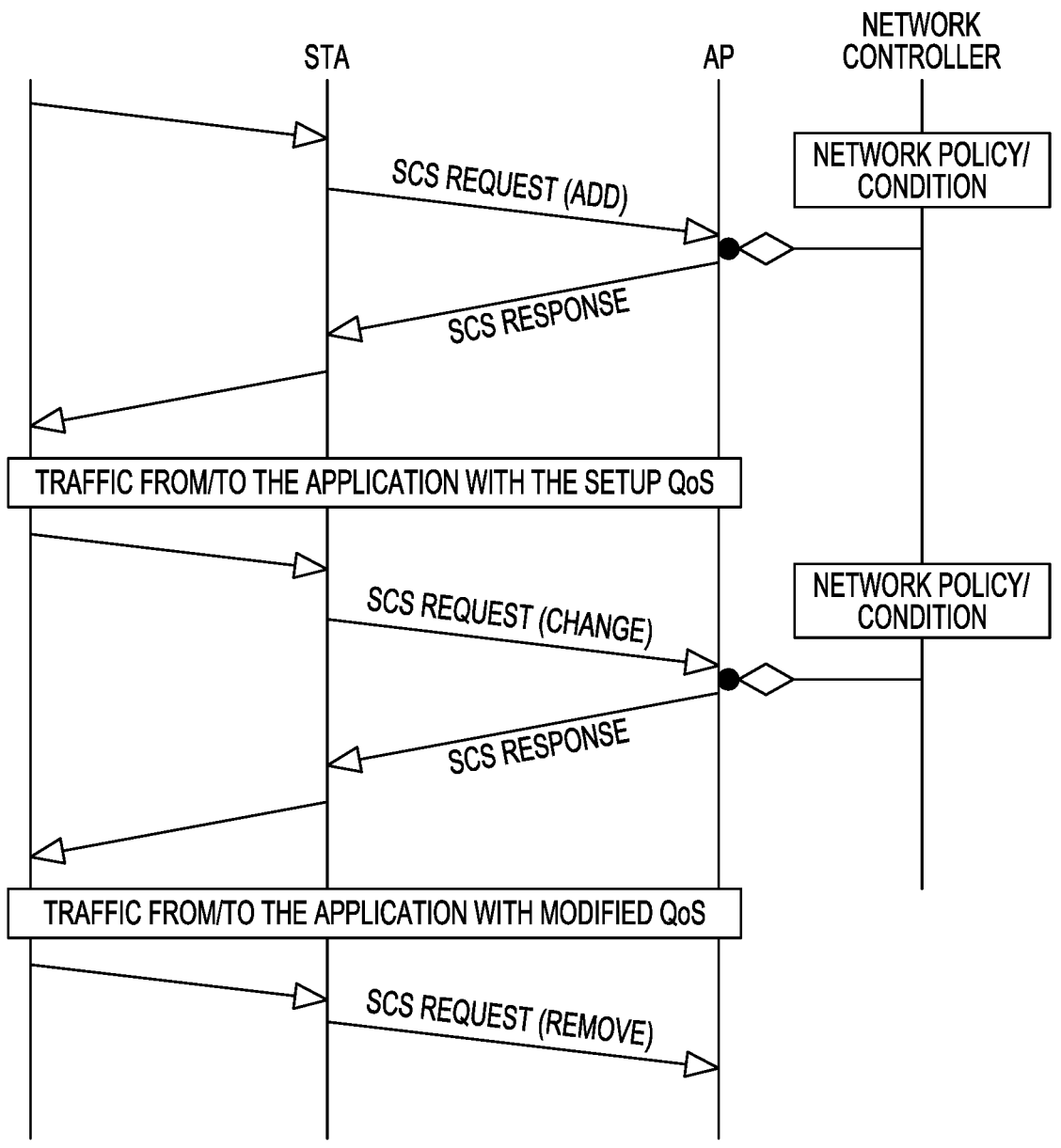
FIG. 10 illustrates a scenario when the STA sets up the QoS and mid-way through the application traffic flow amends the QoS setup, in accordance with some embodiments.
Figure 11:
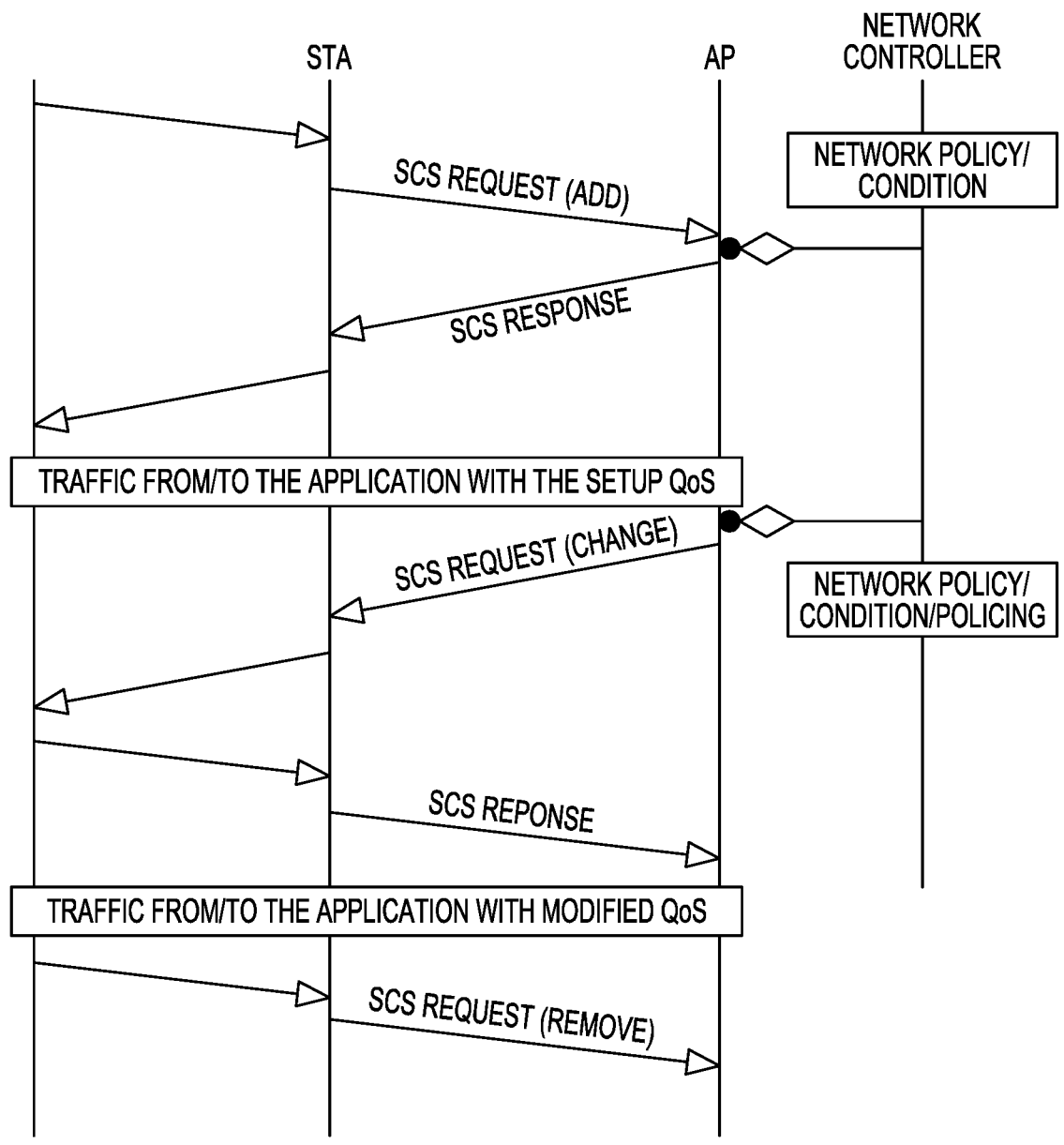
FIG. 11 illustrates a scenario where the AP amends a QoS setup midway through the QoS traffic flow, in accordance with some embodiments.

FIG. 9 illustrates a scenario where the AP initiates QoS Setup with a STA and the STA modifies the QoS setup midway through the flow. The AP sends an SCS Request Frame (Add), and in response the STA sends an SCS Response Frame to set up a QoS flow. Once the QoS flow is setup, QoS traffic may be exchanged. If the STA wants to modify the QoS setup, the STA sends an SCS Request Frame (Change), and the AP responds with an SCS Response Frame. Then QoS traffic may be exchanged in accordance with the modified flows. When the flow is completed, the STA may send an SCS Request Frame (Remove). FIG. 10 illustrates a scenario when the STA sets up the QoS and mid-way through the application traffic flow amends the QoS setup. FIG. 11 illustrates a scenario where the AP amends a QoS setup midway through the QoS traffic flow.

Figure 12:
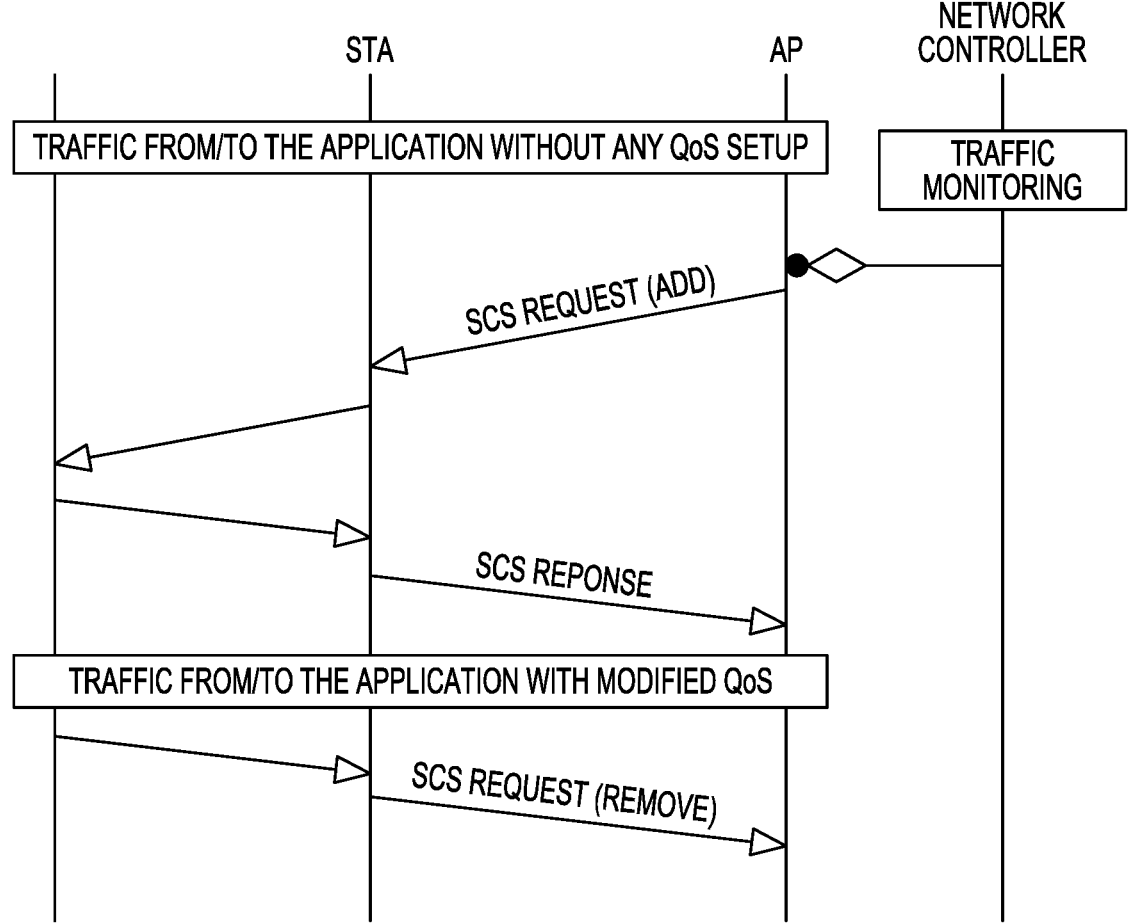
FIG. 12 illustrates a case where the STA initiates QoS traffic without setting up QoS explicitly, in accordance with some embodiments.

FIG. 12 illustrates a case where the STA initiates QoS traffic without setting up QoS explicitly (no SCS Req/Resp exchange), and the AP subsequently based on the observed traffic to/from the STA determines an appropriate QoS for the traffic and sets it up using a SCS Request with the type field in the included SCS Descriptor element set to Add exchange with the STA.

In one embodiment the traffic for the SCS session setup between an AP and STA pair can be exchanged during a TWT or restricted SP. In this case the signaling used to setup the TWT SP or the restricted SP can carry the SCS ID field corresponding to this session. One or more such SCS IDs may be exchanged in case more than one flow are mapped to that SP.

In one embodiment the SCS Request frame from a non-AP STA to an AP STA can contain signaling indicating the session is for a P2P session between the non-AP STA or some STA collocated with the non-AP STA with another peer STA. For example, this signaling can be achieved by a new Request Type subfield value in the SCS Descriptor element or via the Direction subfield in the included TSPEC or modified TSPEC element.

In one embodiment the SCS Request and/or Response frame can contain signaling that allows the traffic identified in the SCS Descriptor element to map to multiple UP or TIDs. For example, the signaling can achieved by one or more of the following:

Adding multiple Intra-AC Priority element to the SCS Descriptor element.

Adding a new element or field that contains a list or bitmap of such UPs.

Adding a bitmap in the TSPEC or modified TSPEC element included with this frame.

In one embodiment the SCS Request/Response frame exchange can signal QoS Setup for a stream between a pair of Multi-Link Devices (MLDs).

FIG. 13 illustrates a Quality-of-Service (QoS) setup procedure 1300 initiated by a non-Access Point Extremely High Throughput Station (non-AP EHT STA) in accordance with some embodiments.

In operation 1302, the non-AP EHT STA encodes an Stream Classification Service (SCS) Request frame for transmission to an associated access point (AP). The SCS request frame is encoded to have a request type field set to "Add" and the SCS request frame contains an SCS Descriptor element having a traffic description field, a traffic classification field, and a Multi-Link Operation (MLO) field.

In operation 1304, the non-AP EHT STA decodes an SCS Response frame from the AP. The SCS Response frame indicates whether the QoS setup has been added.

In operation 1306, the non-AP EHT STA exchanges a QoS traffic flow with the associated AP in accordance with the QoS setup when the QoS setup has been added.

In operation 1308, when the QoS traffic flow ends, non-AP EHT STA encodes a second SCS Request frame for transmission to the AP with the request type field set to "Remove".

EXAMPLES

Example 1 may include a device comprising processing circuitry coupled to storage, the processing circuitry configured to: cause to send a stream classification service (SCS) request to be sent to a first station device; identify an SCS response from the first station device; and perform QoS setup update based on the SCS response.

Example 2 may include the device of example 1 and/or some other example herein, wherein the first station device sends an SCS request with a remove request.

Example 3 may include the device of example 1 and/or some other example herein, wherein the first station device sends an SCS request with a change request.

Example 4 may include the device of example 1 and/or some other example herein, further comprising a transceiver configured to transmit and receive wireless signals.

Example 5 may include the device of example 4 and/or some other example herein, further comprising an antenna coupled to the transceiver to cause to send the frame.

Example 6 may include a non-transitory computer-readable medium storing computer-executable instructions which when executed by one or more processors result in performing operations comprising: causing to send a stream classification service (SCS) request to be sent to a first station device; identifying an SCS response from the first station device; and performing QoS setup update based on the SCS response.

Example 7 may include the non-transitory computer-readable medium of example 6 and/or some other example herein, wherein the first station device sends an SCS request with a remove request.

Example 8 may include the non-transitory computer-readable medium of example 6 and/or some other example herein, wherein the first station device sends an SCS request with a change request.

Example 9 may include a method comprising: causing, by one or more processors, to send a stream classification service (SCS) request to be sent to a first station device; identifying an SCS response from the first station device; and performing QoS setup update based on the SCS response.

Example 10 may include the method of example 9 and/or some other example herein, wherein the first station device sends an SCS request with a remove request.

Example 11 may include the method of example 9 and/or some other example herein, wherein the first station device sends an SCS request with a change request.

Example 12 may include an apparatus comprising means for: causing to send a stream classification service (SCS) request to be sent to a first station device; identifying an SCS response from the first station device; and performing QoS setup update based on the SCS response.

Example 13 may include the apparatus of example 12 and/or some other example herein, wherein the first station device sends an SCS request with a remove request.

Example 14 may include the apparatus of example 12 and/or some other example herein, wherein the first station device sends an SCS request with a change request.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a non-Access Point Extremely High Throughput Station (non-AP EHT STA), the apparatus comprising: processing circuitry; and memory, wherein the non-AP EHT STA is configured for operating as an affiliated STA that is part of a non-AP multi-link device (MLD) that includes a plurality of affiliated non-AP STAs, wherein the non-AP MLD communicates with an AP MLD comprising a plurality of affiliated APs over a plurality of links;

wherein to initiate a Quality-of-Service (QoS) setup for a Stream Classification Service (SCS) stream with the AP MLD at an MLD level, the processing circuitry is configured to:

encode an SCS Request frame for transmission to a first of the affiliated APs of the AP MLD, the SCS request frame encoded to include an SCS Descriptor element containing a QoS characteristics element with a direction subfield set to either uplink or downlink indicating a request for creation of an SCS stream that applies at an MLD level, wherein the QoS characteristics element is to include a request type field set to "Add" to add the SCS stream, wherein the SCS Descriptor element is to include a traffic classification (TCLAS) elements field describing a traffic classification that the non-AP STA is requesting the AP MLD to apply to the SCS stream, and wherein the SCS request frame further encoded to include an SCSID to identify the SCS stream, decode an SCS Response frame from the first affiliated AP, the SCS Response frame indicating whether the SCS stream having QoS characteristics indicated by the QoS characteristics element has been accepted, the SCS Response frame including the SCSID; and when the SCS stream has been added, communicate a traffic flow comprising the SCS stream with the AP MLD in accordance with the QoS characteristics; and encode a second SCS Request frame a QoS characteristics element for transmission to the AP MLD with the request type field set to "Remove" to remove the SCS stream, the second SCS Request frame including the SCSID.

2. The apparatus of claim 1, wherein the non-AP MLD communicates with the AP MLD over the plurality of links using a single medium access control (MAC) service access point (SAP).

3. The apparatus of claim 2, wherein when the SCS stream has been added, the traffic flow comprising the SCS stream is communicated between the non-AP MLD and the AP MLD in accordance with the QoS characteristics over multiple links of the plurality of links.

4. The apparatus of claim 3, wherein the QoS characteristics element is encoded to have a subfield set to indicate that the QoS setup for the SCS stream is for an SCS stream at the MLD level rather than a single link between the non-AP EHT STA and the first affiliated AP.

5. The apparatus of claim 4, wherein the non-AP STA is associated with the first affiliated AP of the AP MLD to which the SCS request frame is sent.

6. The apparatus of claim 5, wherein the SCS stream is an audio-visual (AV) stream.

7. The apparatus of claim 1, wherein to modify the QoS setup for the SCS stream, the processing circuitry is configured to encode a third SCS request frame for transmission to the first affiliated AP with the request type field set to "Change" and include the SCSID in the SCS Descriptor element, wherein modifications to the QoS setup are indicated a traffic description field.

8. The apparatus of claim 7, wherein for modification of the QoS setup for the SCS stream by the first affiliated AP, the processing circuitry is configured to decode an autonomous SCS Response frame from the first affiliated AP, and wherein when the autonomous SCS Response frame has a Dialog Token set to zero (0) and has an SCSID field set to the SCSID of the SCS stream, the processing circuitry is configured to modify the QoS setup in accordance with an SCS Description element of the autonomous SCS Response frame.

9. The apparatus of claim 1, wherein the SCS Descriptor element is encoded to include QoS characteristics comprising: a maximum MAC service data unit (MSDU) size, a latency bound, a minimum service interval, a maximum service interval, a burst size, a MSDU delivery ratio, a medium time, and a service start time.

10. The apparatus of claim 1, wherein the processing circuitry comprises a baseband processor; and wherein the memory is configured to store the QoS characteristics element.

11. An apparatus of an Access Point Extremely High Throughput Station (AP EHT STA), the apparatus comprising: processing circuitry; and memory, wherein the AP EHT STA is configured for operating as an affiliated AP that is part of an AP multi-link device (AP MLD) that includes a plurality of affiliated APs, wherein the AP MLD communicates with a non-AP MLD comprising a plurality of affiliated non-AP station (STAs) over a plurality of links, wherein a Quality-of-Service (QoS) setup for a Stream Classification Service (SCS) stream at an MLD level initiated by one of the STAs of the non-AP MLD, the processing circuitry is configured to:

decode an SCS Request frame received from the one STA of the non-AP MLD, the SCS request frame including a SCS Descriptor element containing a QoS characteristics element with a direction subfield set to either uplink or downlink indicating a request for creation of an SCS stream that applies at an MLD level, wherein the QoS characteristics element includes a request type field set to "Add" to add the SCS stream, wherein the SCS Descriptor element includes a traffic classification (TCLAS) elements field describing a traffic classification that the non-AP STA is requesting the AP MLD to apply to the SCS stream, wherein the SCS request frame further includes an SCSID to identify the SCS stream;

encode an SCS Response frame for transmission to the non-AP MLD, the SCS Response frame indicating whether the SCS stream having QoS characteristics indicated by the QoS characteristics element has been accepted, the SCS Response frame including the SCSID; and when the SCS stream has been added, communicate a traffic flow comprising the SCS stream with the non-AP MLD in accordance with the QoS characteristics; and decode a second SCS Request frame without a QoS characteristics element from the non-AP MLD with the request type field set to "Remove" to remove the SCS stream, the second SCS Request frame including the SCSID.

12. The apparatus of claim 11, wherein the processing circuitry configures the AP MLD to communicate with the non-AP MLD over the plurality of links using a single medium access control (MAC) service access point (SAP).

13. The apparatus of claim 12, wherein when the SCS stream has been added, the traffic flow comprising the SCS stream is communicated between the non-AP MLD and the AP MLD in accordance with the QoS characteristics over multiple links of the plurality of links.

14. The apparatus of claim 13, wherein the QoS characteristics element is encoded to have a subfield set to indicate that the QoS setup for the SCS stream is for an SCS stream at the MLD level rather than a single link between the non-AP EHT STA and the affiliated AP.

\* \* \* \* \*